United States Patent
Quin et al.

(10) Patent No.: US 8,972,792 B2
(45) Date of Patent: Mar. 3, 2015

(54) METHODS, APPARATUS, AND SYSTEMS FOR ELECTRONIC DEVICE RECOVERY

(75) Inventors: Spencer Leavitt George Quin, Kitchener (CA); Andrey Feldman, Hamilton (CA); Robert David Turner, Ottawa (CA); Timothy Richard Tyhurst, Kitchener (CA)

(73) Assignee: BlackBerry Limited, Waterloo (CA)

( * ) Notice: Subject to any disclaimer, the term of this patent is extended or adjusted under 35 U.S.C. 154(b) by 357 days.

(21) Appl. No.: 13/451,403

(22) Filed: Apr. 19, 2012

(65) Prior Publication Data

US 2013/0283091 A1 Oct. 24, 2013

(51) Int. Cl.
*G06F 11/00* (2006.01)
(52) U.S. Cl.
USPC ............................................ 714/38.1; 714/36
(58) Field of Classification Search
USPC ........................... 714/38.1, 36; 717/168–178
See application file for complete search history.

(56) References Cited

U.S. PATENT DOCUMENTS

| | | | |
|---|---|---|---|
| 7,043,664 B1 * | 5/2006 | Chiloyan | 714/5.11 |
| 7,137,034 B2 * | 11/2006 | Largman et al. | 714/23 |
| 7,376,870 B2 * | 5/2008 | Kataria et al. | 714/47.1 |
| 7,673,301 B1 | 3/2010 | Righi et al. | |
| 7,865,775 B2 | 1/2011 | Yao et al. | |
| 2004/0003266 A1 | 1/2004 | Moshir et al. | |
| 2004/0194081 A1 * | 9/2004 | Qumei et al. | 717/173 |
| 2005/0166199 A1 * | 7/2005 | Willis, II | 717/173 |
| 2008/0256526 A1 | 10/2008 | Ellsworth et al. | |
| 2013/0185563 A1 * | 7/2013 | Djabarov et al. | 713/176 |
| 2013/0283091 A1 * | 10/2013 | Quin et al. | 714/3 |

OTHER PUBLICATIONS

European Patent Office, "Extended European Search Report," issued in connection with Application No. 12173245.7, Oct. 8, 2012, 7 pages.

Max Mikh, "Brainstorm: Recovery mode for bricked device", maemo.org/community/brainstorm/view/recovery_mode_for_bricked_device/#internet_terminal, Jan. 3, 2010, 2 pages.

\* cited by examiner

*Primary Examiner* — Philip Guyton
(74) *Attorney, Agent, or Firm* — Hanley, Flight & Zimmerman, LLC

(57) ABSTRACT

Methods, apparatus, and systems for electronic device recovery are disclosed. An example method includes determining that a software request received from a computing device includes an indication of a repair mode of an electronic device, determining a characteristic of the electronic device, determining software to be provided to the electronic device based on the characteristic, and in response to determining that the software request includes the indication of the repair mode, transmitting location information for the software to the computing device.

17 Claims, 5 Drawing Sheets

METHODS, APPARATUS, AND SYSTEMS FOR ELECTRONIC DEVICE RECOVERY

FIELD OF THE DISCLOSURE

This disclosure relates generally to electronic devices, and, more particularly, methods, apparatus, and system for electronic device recovery.

BACKGROUND

Electronic devices, such as portable electronic devices, mobile devices, and so forth, typically include operating software such as firmware, operating systems, etc. This operating software may be updated from time to time. For example, an updated operating system (e.g., a software image of an operating system) may be retrieved from a server and installed on an electronic device replacing a previous version of the operating system. In some instances, the electronic device may be communicatively coupled with another computing device to perform updates to the operating software. For example, a portable electronic device may be communicatively coupled to a personal computer using a universal serial bus cable that facilitates control of the portable electronic device by the personal computer. In such an example, the personal computer may retrieve the operating software, transfer the operating software to the portable electronic device, cause the operating software to be installed on the portable electronic device, and cause the operating system to reboot. In some instances, the personal computer may also cause updated applications to be installed on the portable electronic device. For example, following the reboot, the personal computer may transfer one or more applications to the portable electronic device, cause the one or more applications to be installed, and cause the portable electronic device to be rebooted a second time.

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which.

DETAILED DESCRIPTION

Figure 1:
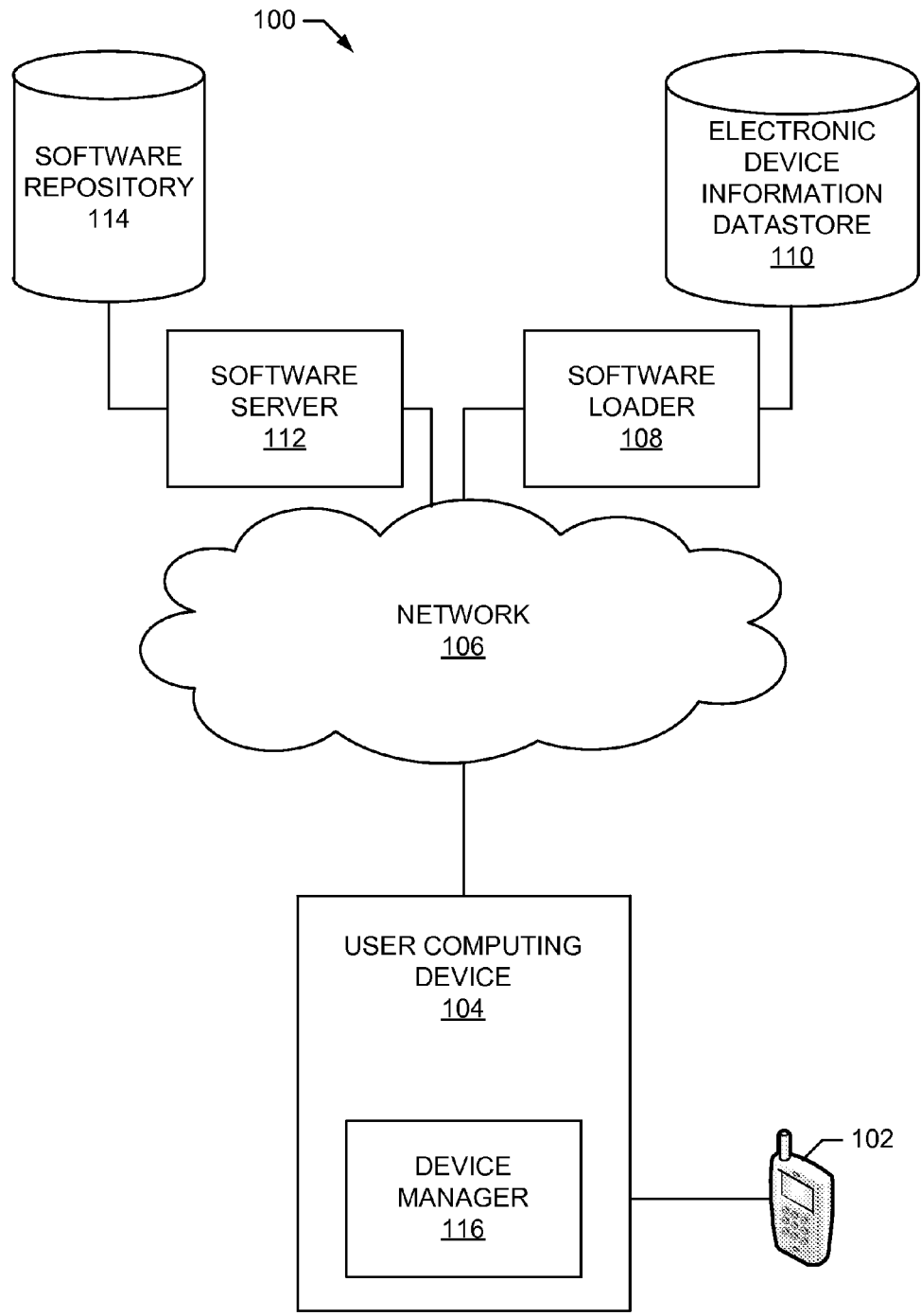
FIG. 1 is a block diagram of an example system for distributing software to an electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, the implementations described herein may be practiced without these specific details. In other instances, well-known methods, procedures and components have not been described in detail so as not to obscure the implementations described herein. Also, the description is not to be considered as limiting the scope of the implementations described herein.

The operating software of electronic devices may occasionally be in a partially or completely inoperative state, sometimes referred to as a "bricked" state. For example, an update of the operating software may be interrupted, memory storing the operating software may encounter an error, a user of the electronic device may install corrupted or invalid operating software on the electronic device, etc. In some such instances, the normal operating software installation is not sufficient or is not desirable for recovering or repairing the electronic device. According to examples disclosed herein, the state of the electronic device is detected by a computing device communicatively coupled to the electronic device. The computing device retrieves available information about the electronic device and transmits the information to a server with a request for repair information for the electronic device. The server determines that the request is for repair or recovery information (rather than, for example, a software update) and transmits retrieval information for the repair information to the computing device. The computing device then retrieves the repair information and causes the repair information to be installed on the computing device. The repair information may be customized based on the information about the electronic device. For example, the information about the electronic device may include a personal identification number (PIN) or other information from which a communications carrier associated with the electronic device may be determined (e.g., the electronic device may be a mobile telephone). The server transmits retrieval information for repair information that is customized for the communications carrier (e.g., the repair information may include images, applications, or other branding characteristics associated with the communications carrier.

FIG. 1 is a block diagram of an example system 100 for distributing software to an electronic device 102. The example system 100 includes the electronic device 102, a user computing device 104, a network 106, a software loader 108, an electronic device information datastore 110, a software server 112, and a software repository 114.

The electronic device 102 of the illustrated example is a mobile telephone. The electronic device 102 may, alternatively, be any type of electronic device such as a portable electronic device, a computer, a tablet computer, a desktop computer, a laptop computer, a media player, a consumer electronic device, a television, an embedded computing device, a vehicle embedded computing device, etc. The electronic device 102 includes operating software and one or more applications. The operating software of the electronic device 102 includes any type of software responsible for managing the operations of the electronic device 102. For example, the operating software may include one or more of firmware, operating system software, a boot read only memory software (e.g., bootrom software that loads an operation system), a boot loader, etc.

The electronic device 102 is communicatively coupled with the user computing device 104. For example, the electronic device 102 may be communicatively coupled with the user computing device 104 using a universal serial bus (USB) connection, a wireless connection, a wired connection, a network connection, or any other type of wired or wireless connection. The communicative coupling facilitates the sharing of information between the electronic device 102 and the user computing device 104.

The user computing device 104 of the illustrated example is a personal computer. Alternatively, the user computing device 104 may be any type of computing device that is capable of communicating with the electronic device 102 and the network 106.

The example user computing device 104 includes a device manager 116. The device manager 116 of the illustrated example is software executing on the user computing device 104 such as, for example, the desktop manager (DTM) for Blackberry devices from Research in Motion®. The device manager 116 manages a relationship between the electronic device 102 and the user computing device 104. For example, the device manager 116 may perform one or more of the following: detecting communicatively coupling of the electronic device 102 with the user computing device 104, querying an operating state of the electronic device 102, installing software on the electronic device 102, sending or retrieving media content and/or applications to or from the electronic device 102, changing settings of the electronic device 102, etc. The device manager 116 also manages communication between the user computing device 104 and both the software loader 108 and the software server 112.

The example device manager 116 determines when the electronic device 102 has been communicatively coupled with user computing device 104. The device manager 116 determines an operating state of the electronic device 102 by attempting to communicate with one or more components of the electronic device 102. For example, the device manager 116 may attempt to communicate with boot read only memory software of the electronic device 102, may attempt to communicate with a service executing on the electronic device 102, may attempt to determine a software version (e.g., an operating software version, an application version, etc.) of the electronic device 102, etc. Based on the determination of the operating state, the device manager 116 communicates with the software loader 108. For example, the device manager 116 may send a repair request to the software loader 108 when the device manager 116 determines that the electronic device is in a partially or completely inoperative state such as, for example, when a component of the electronic device 102 (e.g., the boot read only memory software) does not respond to a query from the device manager 116, the electronic device 102 transmits an error message to the device manager 116, etc. Alternatively, the device manager 116 may send an update or software installation request to the software loader 108 when software (e.g., operating software, applications, etc.) should be updated or installed (e.g., when operating software and/or applications have been updated by a software provider).

The example device manager 116 also causes the user computing device 104 to retrieve software when a response to the request from the software loader 108 is received. According to the illustrated example, the device manager 116 retrieves software (e.g., a repair image) from the software server 112. The software may comprise any number of parts or images. For example, a repair image may comprise a single repair image for an operating system and radio software, separate repair images for an operating system and radio software, or any number of images for any number of components. The device manager 116 then causes the software to be installed on the electronic device 102. For example, the device manager 116 may transfer the software to the electronic device 102 and cause the electronic device 102 to be rebooted after each installation.

The network 106 of the illustrated example is a wide area network that communicatively couples the user computing device 104 with software loader 108 and the software server 112. In some examples, the electronic device 102 may also be communicatively coupled to the network 106. The network 106 may be any type of network and any number of networks may be included. For example, the network 106 may be implemented by any number of local area networks, any number of wide area networks, any number of wireless networks, any number of wired networks, any number of cellular data networks, any number of public networks, any number of private networks, etc.

The software loader 108 of the illustrated example is a server that manages software requests from the user computing device 104. The example software loader 108 is communicatively coupled with the electronic device information datastore 110 to facilitate handling of software requests. In response to the software requests, the example software loader 108 transmits information for retrieving software to the device manager 116 of the user computing device 104. According to the illustrated example, the information for retrieving software may be a universal resource locator (URL) associated with the software server 112. The software loader 108 is described in further detail in conjunction with FIG. 2.

The example electronic device information datastore 110 stores information about electronic devices such as the electronic device 102. The electronic device information datastore 110 may also store information about software available from the software server 112. For example, the electronic device information datastore 110 may store information to facilitate the handling of software requests. The information may include an association of identification information of the electronic device 102 with customization information for software such as, for example, branding information (e.g., branding associated with a communication carrier), capabilities information (e.g., processing speed, memory, storage space, etc.), software version information, user settings, type of device, geographical region, etc. The customization information in the electronic device information datastore 110 may be associated with software distributed by the software server 112. For example, the electronic device information datastore 110 may store information for retrieving software from the software server 112 (e.g., a URL associated with software provided by the software server 112). The electronic device information datastore 110 may be any type of data storage device such as, for example, a database or any other type of storage device.

The software server 112 of the illustrated example is an internet web server that receives and responds to requests for software from the user computing device 104. According to the illustrated example, the requests for software are hypertext transport protocol requests that identify a file and are sent to the software server 112 from the device manager 116 of the user computing device 104 in response to an instruction including a URL from the software loader 108. Alternatively, the requests for software may be any type of requests sent according to any type of protocol such as, for example, extensible markup language (XML), representational state transfer (REST) based XML, simple object access protocol (SOAP), JavaScript object notation (JSON), or any other protocol. The software server 112 services the requests for software by retrieving the requested software form the software repository 114 and transmitting the software to the device manager 116 of the user computing device 104.

The software repository 114 of the illustrated example stores software for the electronic device 102. The software repository 114 may store software for a plurality of devices or different types. Additionally or alternatively, the software repository 114 may store different versions and/or customizations of software for the electronic device 102. The software repository 114 may be any type of data storage device such as, for example, a database or any other type of storage device.

Figure 2:
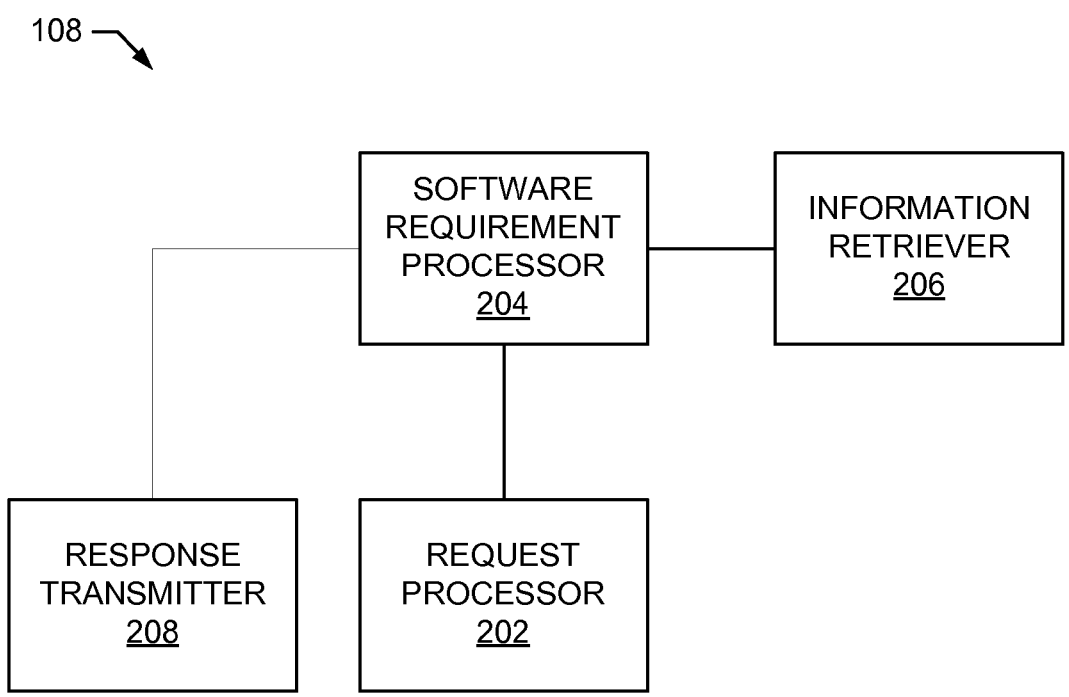
FIG. 2 is a block diagram of an example implementation of the software loader of FIG. 1.

FIG. 2 is a block diagram of an example implementation of the software loader 108 of FIG. 1. The example software loader 108 of FIG. 2 includes a request processor 202, a software requirement processor 204, an information retriever 206, and a response transmitter 208.

The request processor 202 of the illustrated example receives software requests from the device manager 116 of the user computing device 104. The request processor 202 extracts information from the software request to handle the request. According to the illustrated example, the request processor 202 extracts mode information from the software request. For example, the mode information may be a flag, indicator, variable, or other indication of an operating state or mode of the electronic device 102 associated with the software request. The example request processor 202 may determine that the mode information indicates that the software request a repair mode request for an electronic device that is in a partially or completely inoperative state. The request processor 202 transmits the extracted information and the software request to the software requirement processor 204.

The software requirement processor 204 of the illustrated example receives a software request and information extracted from the request from the request processor 202. The example software requirement processor 204 determines the appropriate software to be retrieved by the device manager 116 by analyzing the information in the request in association with the electronic device information datastore 110 accessed via the information retriever 206. For example, the information from the request processor 202 may indicate that the software request is associated with a repair mode and, thus, repair software should be retrieved by the device manager 116. The software requirement processor 204 may further extract information from the software request that indicates an identity of the electronic device 102 (e.g., a PIN value) and may determine a customized software associated with the electronic device 102. Accordingly, the software requirement processor 204 may determine that a device manager 116 should retrieve repair software that is customized for the electronic device 102.

The software requirement processor 204 may determine the software to be retrieved by the device manager 116 by comparing information from the software request to information retrieved from the electronic information datastore 110 by the information retriever 206. For example, the software requirement processor 204 may compare a PIN or other identifier of the electronic device 102 to a record of communication carriers that sold electronic devices to determine that the PIN of the electronic device 102 indicates that a particular communication carrier sold the electronic device 102 and, thus, the software for the electronic device 102 should be branded for that particular communication carrier. The software may additionally or alternatively be customized by the type of the device, user settings, device capabilities, geographical region, etc.

Once the software requirement processor 204 determines the software to be retrieved by the device manager 116, the software requirement processor 204 provides information for that retrieval to the response transmitter 208. For example, the software requirement processor 204 may determine a URL associated with the software to be retrieved and may transmit the URL to the response transmitter 208. While a URL is described herein, any location information for the software may be provided such as an address, a path, a filename, a file identifier, etc.

The response transmitter 208 transmits the information for retrieval of software to the device manager 116 of the user computing device 104 via the network 106.

While an example manner of implementing the software loader 108 of FIG. 1 has been illustrated in FIGS. 1 and 2, one or more of the elements, processes and/or devices illustrated in FIGS. 1 and 2 may be combined, divided, re-arranged, omitted, eliminated and/or implemented in any other way. Further, the example software loader 108, the example request processor 202, the example software requirement processor 204, the example information retriever 206, the example response transmitter 208 and/or, more generally, the components of the example system 100 of FIG. 1 may be implemented by hardware, software, firmware and/or any combination of hardware, software and/or firmware. Thus, for example, any of the example software loader 108, the example request processor 202, the example software requirement processor 204, the example information retriever 206, the example response transmitter 208 and/or, more generally, the components of the example system 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this disclosure are read to cover a purely software and/or firmware implementation, at least one of the example software loader 108, the example request processor 202, the example software requirement processor 204, the example information retriever 206, the example response transmitter 208 and/or, any of the components of the example system 100 of FIG. 1 are hereby expressly defined to include a tangible computer readable medium such as a memory, DVD, CD, Blu-ray, etc. storing the software and/or firmware. Further still, the example software loader 108 or any other component of the system 100 of FIG. 1 may include one or more elements, processes and/or devices in addition to, or instead of, those illustrated in FIGS. 1 and 2, and/or may include more than one of any or all of the illustrated elements, processes and devices.

Figure 3:
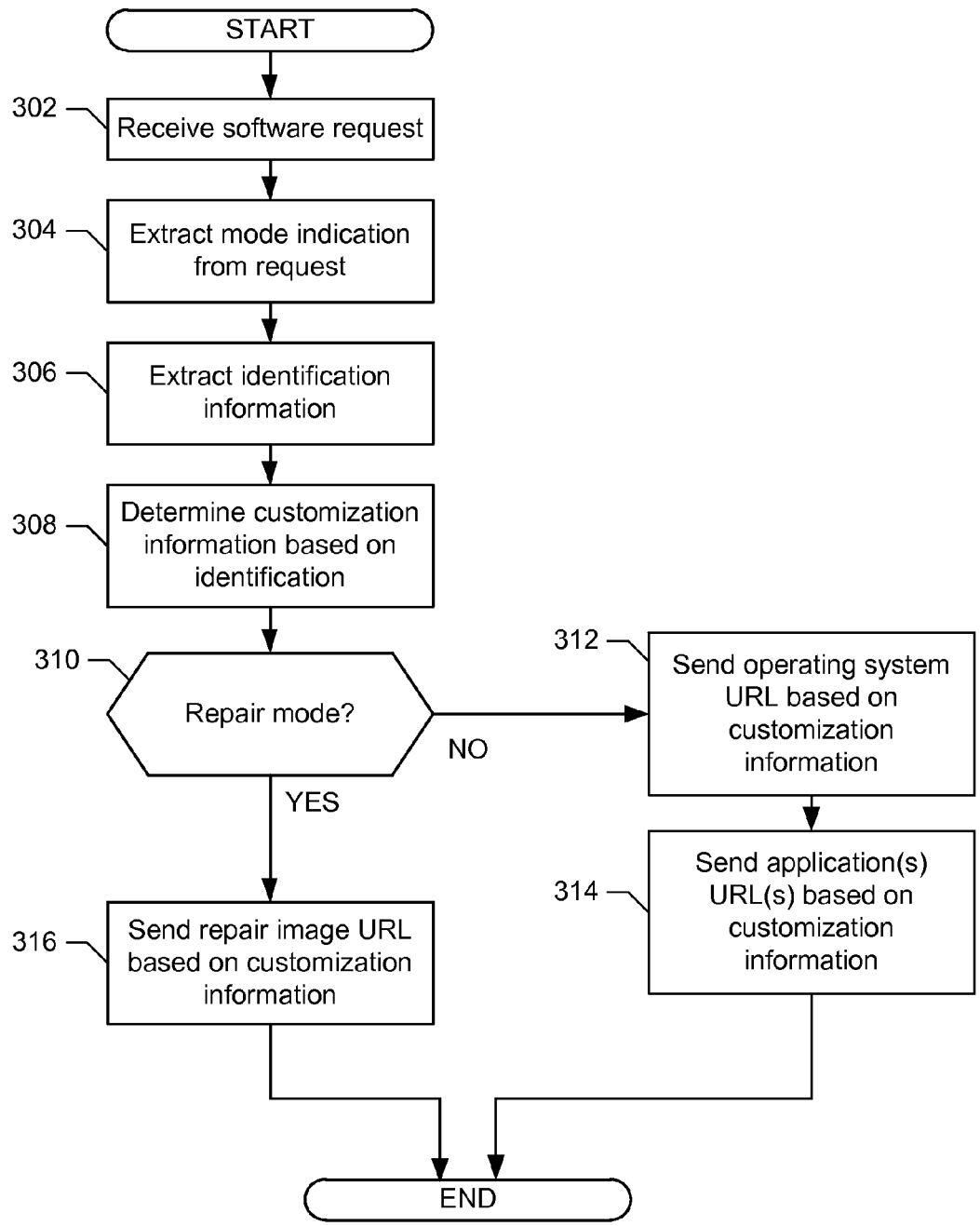
FIG. 3 is a flowchart illustrating an example process to implement the software loader of FIGS. 1 and 2.

Flowcharts representative of example machine readable instructions for implementing the software loader 108 of FIGS. 1 and 2 are shown in FIG. 3. In this example, the machine readable instructions comprise a program for execution by a processor such as the processor 512 shown in the example computer 500 discussed below in connection with FIG. 5. The program may be embodied in or stored on a tangible computer readable medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIG. 3, many other methods of implementing the example software loader 108 may alternatively be used. For example, the order of execution of the blocks may be changed, and/or some of the blocks described may be changed, eliminated, or combined.

As mentioned above, the example process of FIG. 3 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 3 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

While the process of FIG. 3 is described with references to the blocks of FIGS. 1 and 2, elements of the process may be implemented by other than the described blocks of FIGS. 1 and 2 or any other blocks.

The process of FIG. 3 begins when the request processor 202 of the software loader 108 receives a software request (block 302). According to the illustrated example, the software request is transmitted to the software loader 108 by the device manager 116 of the user computing device 104. The example device manager 116 transmits the software request to the software loader 108 on behalf of the electronic device 102. For example, the device manager 116 may transmit a software request to repair the electronic device 102 after determining that the electronic device 102 is in a partially or completely inoperative state (e.g., when the electronic device 102 is not fully responsive to communications from the device manager 116).

The example request processor 202 then extracts a mode indication from the software request (block 304). For example, the device manager 116 may determine an operating mode of the electronic device 102 and send an associated request. The software request may include an indication of a repair mode, a software update mode, a software installation mode, etc. The mode of the software request may be included in the software request by way of a flag, a variable, an error message, an instruction, etc.

The example request processor 202 then extracts identification information associated with the electronic device from the software request (block 306). The identification information may indicate an identity of the electronic device 102 (e.g., a model number, brand, PIN, hardware identifier, network identifier, network address, serial number, device capability, etc.) an identity of a user of the electronic device 102 (e.g., a user name, an email address, a phone number, etc.), an identity of a service provider (e.g., a communication carrier), software version information, etc. The extent of the identification information included in the software request may depend on the operating state of the electronic device 102. For example, when the electronic device 102 is in a partially or completely inoperative state, only limited identification information may be available (e.g., only a PIN may be available). The identification information may be determined by the device manager 116 sending a query to and receiving a response from the electronic device 102, by the device manager 116 accessing a memory or other storage on the electronic device 102, the device manager 116 accessing information previously stored by the device manager 116 when the electronic device 102 was not in an inoperative state, etc. For example, the device manager 116 may access information that was previously stored when the information is not changeable by the electronic device 102.

The example software requirement processor 204 of the software loader 108 then determines software customization information based on the identification information (block 308). The example software requirement processor 204 determines the software customization information by querying the electronic device information datastore 110 via the information retriever 206 using the identification information. For example, where the identification information is a PIN, the information retriever 206 may transmit a query based on the PIN to the electronic device information datastore 110 and transmit the response to the software requirement processor 204. The response to the query may include characteristics of the electronic device 102 such as, for example, a communication carrier associated with the electronic device 102. The software requirement processor 204 may then use the characteristics information to determine which software to instruct the device manager 116 to install on the electronic device 102. For example, where the characteristics identify a communication carrier, the example software requirement processor 204 determines that software that is branded by the communication carrier (when available) should be used by the electronic device. In instances where no customized software is available, the software requirement processor 204 may determine that a generic or default software should be used.

The example software requirement processor 204 then determines if the mode indication determined in block 304 indicates that the software request is for a repair mode (block 310). The repair mode may be any mode where the device manager 116 has determined that the electronic device 102 is in a partially or completely inoperative state and has identified the mode in the software request.

When the software request is not for a repair mode (block 310), the software requirement processor 204 sends to the device manager 116, via the response transmitter 208, a URL for retrieving an operating system for the electronic device 102 based on the customization information (block 312). The software requirement processor 204 also sends to the device manager 116, via the response transmitter 208, a URL for retrieving one or more application(s) for the electronic device 102 based on the customization information (block 314).

According to the illustrated example, the software requirement processor 204 determines the URL from the electronic device information datastore 110. For example, when the software requirement processor 204 determines that a software update is requested and that the software update is to be customized for a particular communication carrier, the software requirement processor 204 retrieves the appropriate URL(s) associated with the software update that is customized. The software requirement processor 204 may retrieve URL(s) for one or more of operating software and/or one or more applications to be installed. For example, a URL for operating software may be transmitted and a URL for applications may be transmitted, only a URL for operating software may be transmitted, only a URL for applications may be transmitted, or any other combination or number of URLs may be transmitted. For example, the operating software may be installed on the electronic device 102, the electronic device 102 may be rebooted to start the operating software, then the one or more applications can be installed, the electronic device 102 can be rebooted, a data backup can be restored (e.g., a backup of user data generated prior to the installation of the software), and the electronic device 102 can be rebooted one more time. In some instances, parts and/or subsets of the operating software and/or applications may be identified by the URL(s). For example, a patch for an operating system and/or application may be identified.

After sending the URL for the one or more application(s), the process of FIG. 3 terminates. As described in conjunction with FIG. 4, the device manager 116 then retrieves the operating software and/or application using the URL(s) and transfers the operating software and/or applications to the electronic device 102 for installation.

Returning to block 310, when the software request is for a repair mode, the software requirement processor 204 sends to the device manager 116, via the response transmitter 208, a URL for retrieving a repair image based on the customization information (block 316).

For example, the software requirement processor 204 may determine a repair mode is requested by the device manger 116 and, optionally, may determine the extent of the repair requested (e.g., partial corruption to be repaired by an installation of a part of the operating software, complete corruption to be repaired by a complete installation of all operating software, etc.). The software may comprise any number of parts or images. For example, a repair image may comprise a single repair image for an operating system and radio software, separate repair images for an operating system and radio software, or any number of images for any number of components. The repair image(s) may, optionally, include all components needed to be installed to restore the electronic device 102 to an operative state without further user intervention (e.g., without the need for a user to download further components for manual installation). In some instances a part of a repair image can be sent based on the determined state of the electronic device 102 and, thus, the size of the image that must be transferred and installed may be reduced. The software requirement processor 204 may then retrieve a URL for a repair image that can be installed on the electronic device 102 as a single package, which may, optionally, only require a single reboot. For example, the repair image may include both operating software and applications. For example, when the electronic device 102 is in an inoperative state, it may be necessary to reinstall all software components and, thus, the operating software and the applications can be installed as a single package or image followed by a single reboot.

After sending the URL for the one or more application(s), the process of FIG. 3 terminates. As described in conjunction with FIG. 4, the device manager 116 then retrieves the repair image using the URL(s) and transfers the repair image to the electronic device 102 for installation.

Figure 4:
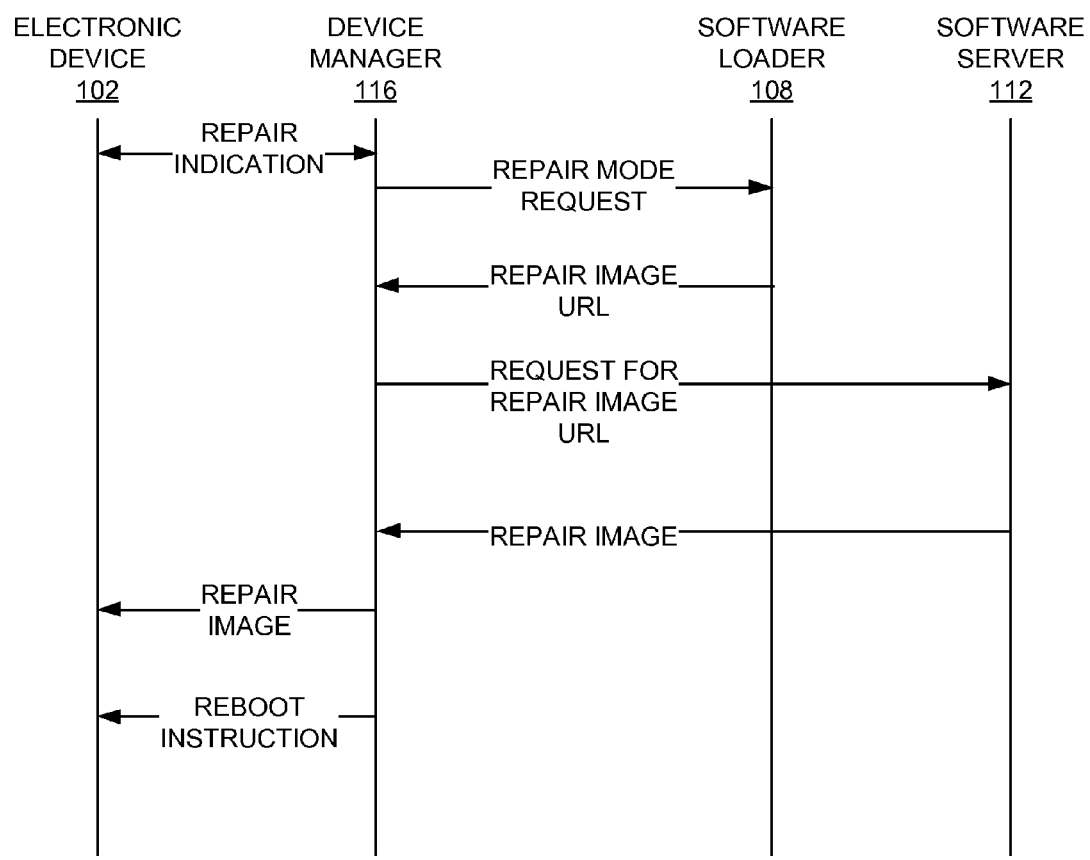
FIG. 4 is a message diagram of an example implementation of the system of FIG. 1

FIG. 4 is a message diagram of an example implementation of the system of FIG. 1. The example message flow begins when the mobile device 102 and device manager 116 exchange a repair indication. The repair indication may comprise several messages. For example, the device manager 116 may send a message to the electronic device 102 (e.g., to a boot read only memory of the electronic device 102) and wait for a response. If no response is received or a response indicating an error is received, the device manager 116 may determine that a repair mode is indicated.

In response to determining that repair is indicated, the device manager 116 transmits a repair mode request to the software loader 108. As described in conjunction with FIG. 3, the software loader 108 processes the repair mode request and transmits a repair image URL to the device manager 116.

In response to the URL, the device manager 116 sends a request for the repair image to the URL, which, according to the illustrated example, is associated with the software server 112. In response to the request, the software server 112 transmits the repair image to the device manager 116.

Upon receipt of the repair image, the device manager 116 transfers the repair image to the mobile device 102. For example, the device manager 116 may cause the repair image to be installed on the mobile device 102. Transferring the repair image may comprise one or more of verifying the validity of the repair image, checking the compatibility of the repair image with the electronic device 102, decompressing the repair image, decrypting the repair image, etc. The device manager 116 then sends a reboot instruction to the electronic device 102. If the repair process is successful, the electronic device 102 will no longer be in an inoperative state.

While the foregoing describes a single repair image, the repair image may comprise multiple images, files, or components.

Figure 5:
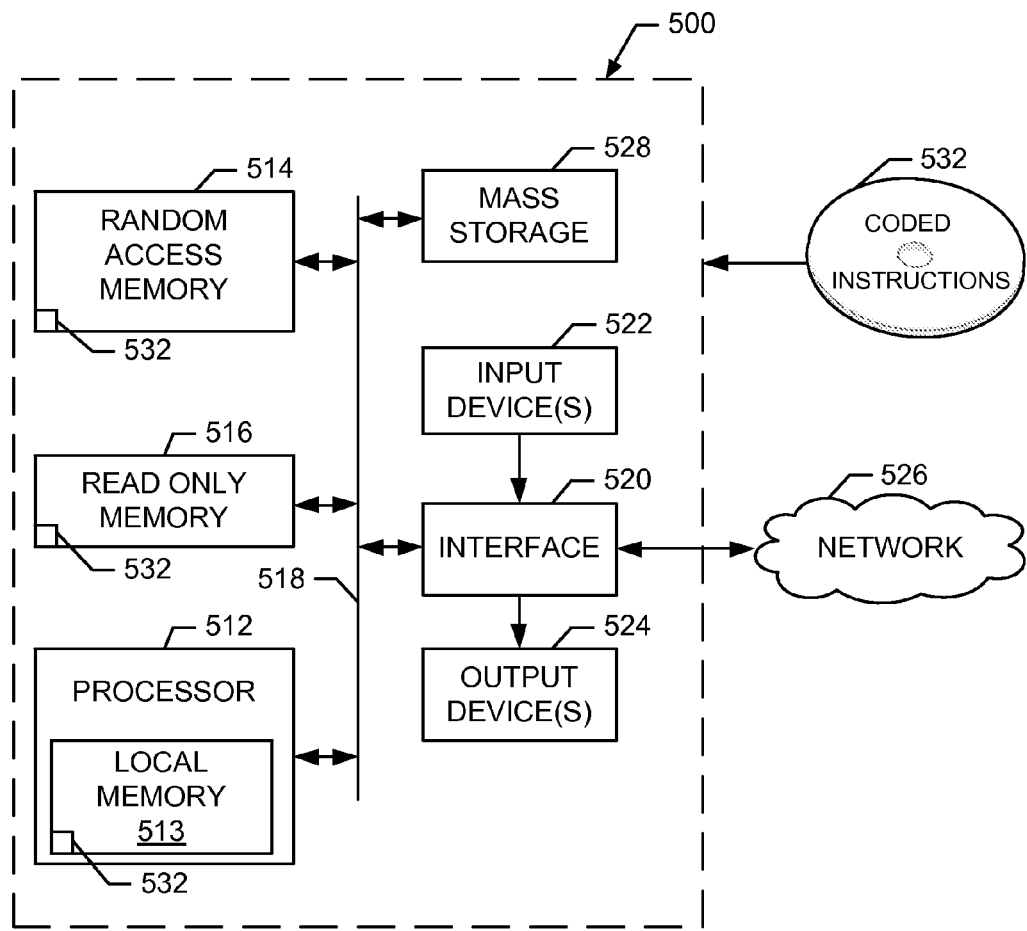
FIG. 5 is a block diagram of an example computer capable of executing the instructions of FIG. 3 to implement, for example, the software loader of FIGS. 1 and 2.

FIG. 5 is a block diagram of an example computer 500 capable of executing the instructions of FIG. 3 to implement the software loader 108 of FIGS. 1-2. Additionally, the computer 500 is capable of executing instructions to implement one or more of the components of the system 100 of FIG. 1. The computer 500 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 500 of the instant example includes a processor 512. For example, the processor 512 can be implemented by one or more microprocessors or controllers from any desired family or manufacturer.

The processor 512 includes a local memory 513 (e.g., a cache) and is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RD RAM) and/or any other type of random access memory device. The non-volatile memory 516 may be implemented by flash memory and/or any other desired type of memory device. Access to the main memory 514, 516 is controlled by a memory controller.

The computer 500 also includes an interface circuit 520. The interface circuit 520 may be implemented by any type of interface standard, such as an Ethernet interface, a universal serial bus (USB), and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a trackpad, a trackball, isopoint and/or a voice recognition system.

One or more output devices 524 are also connected to the interface circuit 520. The output devices 524 can be implemented, for example, by display devices (e.g., a liquid crystal display, a cathode ray tube display (CRT), a printer and/or speakers). The interface circuit 520, thus, typically includes a graphics driver card.

The interface circuit 520 also includes a communication device such as a modem, a network interface card, a cellular network interface, etc. to facilitate exchange of data with external computers via a network 526 (e.g., an Ethernet connection, a digital subscriber line (DSL), a telephone line, coaxial cable, a cellular telephone system, etc.).

The computer 500 also includes one or more mass storage devices 528 for storing software and data. Examples of such mass storage devices 528 include floppy disk drives, hard drive disks, compact disk drives and digital versatile disk (DVD) drives.

The coded instructions 532 of FIG. 5 may be stored in the mass storage device 528, in the volatile memory 514, in the non-volatile memory 516, and/or on a removable storage medium such as a CD or DVD.

From the foregoing, it will be appreciate that the above disclosed methods, apparatus, articles of manufacture, and systems facilitate the installation of software on an electronic device. Some implementations facilitate the installation of software to repair a partially or completely inoperative electronic device. In some examples, a software upgrade or update utilizes a first reboot following installation of operating software and a second update following installation of application software. In contrast, when a repair mode is determined, a single repair image can be installed followed by a single reboot of the electronic device. In some examples as disclosed herein, the software provided to the electronic device can be customized based on characteristics of the electronic device. For example, software may be branded (e.g., branded for a communication carrier such as AT&T®, Verizon®, Sprint®, etc.). In some implementations, a smaller operating software image can be provided when a device is not in an inoperative state because the software loader is aware of the operation state of the electronic device and, thus, does not need to send a full system restoration image (e.g., a full restoration repair image may be utilized when the electronic device is in an inoperative state).

Although certain example methods, apparatus, articles of manufacture, and systems have been described herein, the scope of coverage of this disclosure is not limited thereto. On the contrary, this disclosure covers all methods, apparatus, articles of manufacture, and systems fairly falling within the scope of the claims of this disclosure.

What is claimed is:

1. A method comprising:
  determining that a software request received from a computing device includes an indication of a repair mode of an electronic device;
  determining a characteristic of the electronic device;
  determining software to be provided to the electronic device based on the characteristic;
  in response to determining that the software request includes the indication of the repair mode, transmitting location information for the software to the computing device, wherein the location information is associated with the repair mode;
  determining that a second software request does not include the indication of the repair mode of an electronic device; and
  in response to determining that the second software request does not include the indication of the repair mode, transmitting to the computing device first location information for an operating software and second location information for an application.

2. The method according to claim 1, wherein the location information is associated with a repair image of the software.

3. The method according to claim 2, wherein the repair image includes an operating software and an application.

4. The method according to claim 1, wherein the location information is a universal resource locator.

5. The method according to claim 1, wherein the characteristic is a personal identification number associated with the electronic device.

6. The method according to claim 5, further comprising determining a communication carrier associated with the personal identification number.

7. The method according to claim 6, wherein determining the software to be provided to the electronic device based on the characteristic comprises determining software that is branded for the communication carrier.

8. A system comprising:
  an electronic device;
  a computing device to:
    determine that the electronic device is in an inoperative state;
    determine a characteristic of the electronic device; and
    transmit a software request indicating that the electronic device is in an inoperative state and including the characteristic;
  a server to:
    determine that the software request received from the computing device indicates that the electronic device is in an operative state;
    determine software to be provided to the electronic device based on the characteristic; and in response to determining that the software request indicates that the electronic device is in the inoperative state, transmitting location information for the software to the computing device, wherein the location information is associated with a repair mode;
    determine that a second software request from a second computing device does not include the indication of the inoperative state; and
    in response to determining that the second software request does not include the indication of the inoperative state, transmit first location information for an operating software and second location information for an application to the second computing device.

9. The system according to claim 8, wherein the location information is associated with a repair image of the software.

10. The system according to claim 9, wherein the repair image includes an operating software and an application.

11. The system according to claim 8, wherein the location information is a universal resource locator.

12. The system according to claim 8, wherein the characteristic is a personal identification number associated with the electronic device.

13. The system according to claim 12, wherein the server is further to determine a communication carrier associated with the personal identification number.

14. The system according to claim 13, wherein the server is to determine the software to be provided to the electronic device based on the characteristic by determining software that is branded for the communication carrier.

15. The system according to claim 8, further comprising a software server, wherein the computing device is further to transmit a request for the software to the software server based on the location information.

16. The system according to claim 8, wherein the computing device is to transfer the software to the electronic device.

17. The system according to claim 16, wherein the computing device is to cause the electronic device to be rebooted after transferring the software to the electronic device.

* * * * *